United States Patent [19]

Claridge et al.

[11] 3,767,455

[45] Oct. 23, 1973

[54] TREATMENT OF OXIDE PIGMENTS

[75] Inventors: Maurice Arthur Claridge, Waltham, Grimsby; Peter Lyndon Cowe, Cleethorpes, both of England

[73] Assignee: Laporte Industries Limited, London, England

[22] Filed: Jan. 8, 1971

[21] Appl. No.: 105,114

[30] Foreign Application Priority Data
Jan. 15, 1970   Great Britain...................... 1,984/70

[52] U.S. Cl. .......... 117/65.2, 106/308 B, 117/100 B
[51] Int. Cl................................................. B44d 1/44
[58] Field of Search ........................ 106/288 B, 300; 117/65.2, 62, 100 B, 169

[56] References Cited
UNITED STATES PATENTS

| | | | |
|---|---|---|---|
| 3,515,566 | 6/1970 | Moody et al........................ | 106/300 |
| 3,015,573 | 1/1962 | Myers et al......................... | 106/300 |
| 2,150,235 | 3/1939 | McKinney............................ | 106/300 |
| 3,086,877 | 4/1963 | Sheehan et al. ..................... | 106/300 |
| 3,382,042 | 5/1968 | Richardson et al.................. | 106/300 |
| 3,468,689 | 9/1969 | Lott et al. ......................... | 106/288 X |
| 3,488,204 | 1/1970 | Jordan et al...................... | 106/300 X |

*Primary Examiner*—Murray Katz
*Assistant Examiner*—M. R. Lusignan
*Attorney*—Holcombe, Wetherill & Brisebois

[57] ABSTRACT

Titanium dioxide pigment is coated with one or more substances selected from hydroxides, hydrous oxides, phosphates, and basic sulphates, and the coated pigment is subjected to hydrothermal pressure treatment by being maintained at a temperature of at least 50°C. in contact with liquid water, with a total ambient pressure of greater than one atmosphere.

11 Claims, No Drawings

TREATMENT OF OXIDE PIGMENTS

This invention relates to the treatment of oxide pigments, and especially to the treatment of titanium dioxide pigments.

It has become well-established practice to coat pigmentary oxide particles with one or more inorganic substances, in order to improve various properties of the pigmentary particles. Thus, for example, the hiding power and dispersibility of pigmentary titanium dioxide is improved by coating the pigment with one or more hydrous oxides. Such coatings also reduce the chemical reactivity of the pigmentary particles and increase the resistance of the particles to attack by light.

Although coated pigments have very desirable properties in some respects, they tend to be somewhat difficult to mill and to filter, and these processing difficulties tend in turn to impair the gloss of the finished pigment, and may also impair its oil absorption value. Further, although it is desirable for some purposes to apply a relatively thick coating to oxide pigments, the problems involved in milling and filtering become increasingly severe as the thickness of the coating increases. Especially great milling difficulties are encountered when, in accordance with a previous proposal for improving the photochemical stability of titanium dioxide pigments the coated pigment is baked at an elevated temperature before being milled.

The present invention provides a process for the treatment of an oxide pigment, which comprises coating the pigment with one or more substances selected from hydroxides, hydrous oxides, phosphates, and basic sulphates, and thereafter subjecting the coated pigment to hydrothermal pressure treatment by maintaining the coated pigment at a temperature of at least 50°C. in contact with liquid water, the total ambient pressure being greater than one atmosphere.

The hydrothermal pressure treatment in accordance with the invention leads generally to an improvement in the ease of milling of coated oxide pigments. In addition, certain important characteristics of the coated pigment, notably its gloss and oil absorption value, can be improved by the hydrothermal pressure treatment process. Moreover, in some cases, and, in particular, in the case of titanium dioxide pigments having a coating comprising hydrous alumina and hydrous silica, the treatment can have a beneficial effect on the hiding power and photochemical stability of coated oxide pigments.

The oxide pigment may be a chromic oxide or iron oxide pigment, but an especially important form of the process of the invention is that in which the oxide pigment is pigmentary titanium dioxide whether obtained from titanium sulphate or from titanium tetrachloride. The titanium dioxide pigment may, for example, be a composite pigment (with calcium sulphate or barium sulphate), or it may be a pigment extended with china clay, talc, silica, or an alumino-silicate. A process for the manufacture of pigmentary titanium dioxide is described in the Specification accompanying our copending U.S. application Ser. No. 97,541, filed Dec. 14, 1970.

As it is essential that the ambient pressure exceeds one atmosphere for at least part of the period in which the coated pigment is in contact with the water, this stage of the process must, of course, be carried out in a vessel, for example, in autoclave, in which a superatmospheric pressure can be maintained.

Advantageously, the superatmospheric pressure is that pressure obtained when the aqueous mixture is sealed in a closed vessel and thereafter heated to the desired temperature. If it is desired to increase the total pressure without increasing the temperature, then the pressure may be augmented by introducing a gas into the vessel. Advantageously, any gas introduced into the treatment vessel is air or nitrogen, although any gas may of course be used which does not have a detrimental effect on the properties of the coated pigment.

Preferably, the temperature at which the coated pigment is maintained is at least 150°C. As part of the water present in the treatment vessel must be in liquid form, the temperature within the treatment vessel must not exceed the critical temperature of water (374°C.).

The amount of water in the treatment vessel and the conditions of temperature and pressure therein are advantageously such that substantially the whole of the exposed surface area of the coated pigment is in contact with liquid water.

Any hydroxide, hydrated oxide, phosphate, or basic sulphate used to coat the pigment is advantageously a compound of one or more of beryllium, calcium, magnesium, barium, boron, aluminium, silicon, tin, lead, antimony, titanium, zirconium, hafnium, niobium, tantalum, zinc and cerium.

Preferred phosphates are those of titanium, aluminium, and zirconium.

Preferably, the pigment is coated with one or more substances selected from hydroxides, hydrous oxides, and basic sulphates. The coating may be applied to the pigmentary particles in any suitable manner. Normally, the coating is applied by adding the appropriate surface-treating agent or agents to an aqueous slurry of the pigment. Thus, for example, the coating may be deposited on the pigment by contacting the pigment with an alkaline agent and with an acid-reacting compound of the desired element. Alternatively, the coating may be formed by treating the pigment with an acid-reacting compound of a selected element and with a basic compound of the same element or of another selected element. Thus, for example, the coating may be the result of treating the pigment with titanium tetrachloride and sodium aluminate.

As an alternative to forming the coating by an acid-base reaction, it may be formed by hydrolysis of a compound of the desired element, for example, by the hydrolysis of titanium tetrachloride.

Advantageously, the coating is formed by precipitating quantities of at least two hydroxides or hydrated oxides of one or more of aluminium, silicon, boron, titanium, antimony, zinc, magnesium, tin, lead, cerium and zirconium into intimate association with the pigment.

The coating may consist of one layer formed of co-precipitation of two or more hydroxides, hydrated oxides, phosphates and/or basic sulphates, or of a plurality of discrete layers, each such discrete layer having been deposited separately. Where the coating consists of a plurality of discrete layers, each layer may consist of a single hydroxide, hydrous oxide, phosphate, or basic sulphate, or some or all of the layers may consist of more than one such compound.

When the oxide pigment is a titanium dioxide pigment the surface coating may be formed, for example, according to a known process. In that process, a first coating of hydrous alumina is formed on the pigment, a part of the resulting coating is dissolved, and a second coating is formed comprising re-precipitated alumina and a hydrous oxide of one or more of the elements titanium, zirconium, cerium, bismuth, antimony, silicon, tin, and zinc.

With regard to the total weight of the coating that may be formed on the pigment, the limits are not critical; but, as is well-known in the art of surface-treating oxide pigments, a suitable total weight will normally lie in the range of from about 0.5 to about 25 percent, based on the weight of the uncoated pigment.

The reason why the hydrothermal pressure treatment of coated pigments in accordance with the present invention leads to an improvement in the case of milling of the pigment is not fully understood, but it seems clear that the improvement results from changes in the structure of the surface coating brought about by the treatment process. The structural changes may result from changes in the chemical composition of the coating brought about by the treatment process.

Thus, for example, coatings consisting of one or more hydrous oxides generally have many of the properties of gels and, in consequence, such coatings tend to function as an adhesive during the drying process which normally precedes milling. Adjacent pigmentary particles are bound together by the adhesive action, and relatively intensive milling is required in order to overcome the binding forces, especially when a thick coating has been applied to the pigmentary particles.

After, drying, coated pigmentary particles that have been treated in accordance with the invention are much less tightly bound together as compared with untreated coated pigment, and it is therefore easier to break down the aggregates by milling. The treatment also tends to densify the coatings, and this leads in turn to the oil absorption value of the finished pigment being lower than that of untreated pigment. In general, the filtration rate of the coated pigment and/or the solids content of the resulting filter cake are also improved by the treatment process, although such improvements are not found in the case of certain coatings.

The structural changes which take place in the coatings can be detected by electron microscopy and are generally accompanied by changes in the solubility of the coating. Thus, for example, the acid solubility of hydrous alumina an of hydrous titania decreases with increasing time at constant pressure and temperature. Further, the time required to produce a given solubility change will, in general, be shorter the higher the temperature and pressure employed.

The extent to which the structure of the surface coating is modified depends on the composition of the coating, on the pressure and temperature employed during the hydrothermal pressure treatment, and on the duration of the treatment process. These same parameters also influence the extent to which the oil absorption and gloss values of a coated pigment are altered by the treatment process.

It will generally be found that, for a treatment of a given duration at pressures of up to about 600 p.s.i.g., the gloss and oil absorption values of the finished pigment will be increasingly good the higher the temperature at which the coated pigment is maintained. Also, it will generally be found that, for a treatment effected at a given temperature and within the same pressure range, there will be a progressive improvement in the gloss and oil absorption of the pigment as the duration of the treatment is increased, although the improvement resulting from prolonging the treatment is not so marked as that resulting from increasing the temperature. Typically, treatment times in the range of from 15 minutes to 2 hours will effect a useful improvement in the gloss and oil absorption values of the pigment.

In the early stages of the treatment, the coating progressively loses its amorphous character and becomes more granular in appearance; if the treatment is continued, the coating then becomes microcrystalline over the whole of the pigment surface; if the treatment is continued still further, the microcrystals shrink away from parts of the surface of the particles, and macrocrystals grow on certain sites. Ultimately, the coating consists predominantly of such macrocrystals projecting from the surface of the particles. The macrocrystals are most commonly in the form of platelets, needles, spikes or rods.

The time required in order to reach any given coating structure decreases with increasing temperature and can decrease, at least in some circumstances, with increasing pressure, and, until the ultimate macrocrystalline stage is reached, the coating structure will change progressively with increasing time at constant pressure and temperature.

It is found that a coating of hydrous alumina becomes microcrystalline after about 20 minutes at 208°C. and at a total ambient pressure of 250 p.s.i.g. Macrocrystals begin to form in a silica/alumina coating after about 15 minutes at 246°C and 500 p.s.i.g.

In selecting the temperature and pressure which are to be maintained in order to bring about any particular structural modification of the coating, an allowance should be made for the period of heating up and cooling down the treatment vessel. This allowance is especially important when a large vessel is used, which may take a relatively long period of time to heat up and cool down.

For those coated pigments of which the photochemical stability is improved by hydrothermal pressure treatment in accordance with the invention, the extent of the improvement is dependent on the particular conditions employed in the treatment process and on the duration of the process. In the case of pigments having a coating comprising hydrous alumina and hydrous silica, the photochemical stability is greater the longer the treatment process is continued. The term photochemical stability denotes the brightness retention and resistance to yellowing of a paper laminate that incorporates the treated pigment. The time required to reach a given photochemical stability in any particular case is shorter the higher the temperature or pressure involved. After a certain time, however, the photochemical stability remains constant with respect to increased temperature, pressure, or time until, if the process is continued still further, there is a progressive deterioration in the photochemical stability. It has been found that the photochemical stability begins to deteriorate at the onset of the formation of the macrocrystals referred to hereinbefore. Although the treatment conditions required in order to reach this point are very sensitive to changes in the coating parameters, the conditions which give rise to the maximum photochemical stability in any particular case can be found by routine experiments, as there is a range of conditions over which the photochemical stability is substantially invariant. Moreover, it has been found that some improvement in photochemical stability is obtained at any point before the maximum.

The parameters of the coating which influence the process conditions that lead to the formation of macrocrystals are the nature of the constituents of the coating, the relative proportions of the constituents of a mixed coating, the thickness of the coating and the way in which it has been applied.

Although the light stability of pigments of which the coating has been rendered macrocrystalline tends to be unsatisfactory (and the formation of macrocrystals may lead to a deterioration in the gloss value of the pigment, especially if relatively large crystals are formed), the characteristic crystalline habit of such pigments renders them useful for opacifying paper and in paper coatings.

The hydrothermal pressure treatment in accordance with the invention may be carried out in any suitable pressure vessel, for example, in a stirred autoclave or in an autoclave to which is imparted a rocking or rotating motion. Instead, the treatment may be carried out in a non-agitated autoclave. Thus, for example, an aqueous slurry of pigmentary material may be treated in a stirred vessel, and a thick paste may be treated in a non-agitated vessel. As a further possibility, the pressure treatment may be carried out in a vessel having a constricted outlet to enable a superatmospheric pressure to be established in the vessel; the vessel may be of generally tubular form.

The hydrothermal pressure treatment may be carried out immediately after coating the pigment, that is to say, before washing the coated pigment in order to remove soluble salts. If a conventional autoclave is to be used, it is preferable to remove the soluble salts before treating the coated pigment, as such removal decreases the extent of corrosion of the inner surfaces of the autoclave. On the other hand, the presence of soluble salts can in some cases have a beneficial effect on the crystal habit and defect structure of the treated pigment.

Advantageously, the superatmospheric pressure in the treatment vessel is used to assist in conveying the treated pigment to the next succeeding stage in the manufacture of the final product, possibly as part of a continuous treatment process. For example, if the coated pigment is washed prior to being treated in accordance with the invention, the excess pressure can be used to assist in conveying the pigment to a spray drier.

The invention also provides a paint, paper, or paper laminate that incorporates an oxide pigment that has been treated in accordance with the invention.

The following Examples illustrate the invention:

In each of the Examples, the pressure attained in the pressure treatment vessel was that pressure obtained by sealing in the vessel an aqueous mixture including the coated pigment, and then heating the vessel up to the quoted temperature.

EXAMPLE 1

An aqueous suspension of dry-ground pigmentary titanium dioxide, of which 98.4 percent was in the rutile crystallographic form, was prepared by dispersing 300 grams of the oxide in 1 litre of water in the presence of 0.4 percent by weight sodium silicate (calculated as $SiO_2$ and based on the weight of $TiO_2$) as dispersing agent. Particles larger than 5 microns in diameter were then removed by allowing them to settle out under the action of gravity for an appropriate time and decanting the remaining suspension of fine particles.

The fine titanium dioxide particles in suspension were then coated with a mixture of the hydrous oxides of titanium, silicon and aluminium by adding an aqueous solution of each of titanium sulphate, sodium silicate and aluminium sulphate to the suspension and thereafter adding sufficient caustic soda solution to adjust the pH of the suspension of 7.2. The quantities of titanium sulphate, sodium silicate and aluminium sulphate were sufficient to yield 3.0 percent hydrous alumina (calculated as $Al_2O_3$), 3.0 percent hydrous silica (calculated as $SiO_2$ and including the 0.4 percent added as dispersant) and 1.0 percent hydrous titania (calculated as $TiO_2$), all the percentages being by weight and based on the weight of titanium dioxide in the initial suspension.

After coating of the pigment, the resulting aqueous slurry was washed to remove soluble salts and then filtered. The wet filter cake, which had a solids content of 51 percent by weight, was divided into two portions A and B which were treated as described below.

Portion A was dried under atmospheric pressure in a standard laboratory oven for 16 hours at 110°C..

Portion B was contacted with water in an autoclave for 1 hour at 185°C., the total pressure in the autoclave being 150 pounds per square inch gauge (p.s.i.g.). After cooling of the treated pigment, it was dried in the same manner as described above for portion A.

Each of the two dried portions, A and B, was then tested in an emulsion paint formulation and in a paper laminate formulation.

The emulsion paint test was carried out as follows:

A known standard weight of the pigment was stirred into a known standard quantity of a solution of a hydroxyl alkyl cellulose thickener until the pigment was thoroughly wetted. The viscosity of the resulting emulsion was measured, and the changes in viscosity on adding successive quantities of tetron was observed until there was no further change in viscosity. The amount of tetron required in order to attain this limiting viscosity is a measure of the ease of dispersibility of the pigment. The results of this test are shown in the following Table, which also shows the hiding power, in square feet per imperial gallon, of an air-drying acrylic resin paint containing 37 percent by weight of the pigment. The hiding power was determined by the method described in the American Society for Testing Materials publication D 1738-60T, issued in 1960, with the substitution of Imperial gallons for U.S. gallons where appropriate. The hiding power is therefore the number of square feet over which an Imperial gallon of paint can be uniformly spread to produce a contrast ratio C=0.98, the contrast ratio being defined in the ASTM publication.

|  | Initial viscosity | Final viscosity | Amount tetron required | Hiding power |
| --- | --- | --- | --- | --- |
| Portion A | 8.6 | 0.8 | 0.05 | 472 |
| Portion B | 2.4 | 0.8 | 0.03 | 565 |

It can be seen from the above Table that the dispersibility and hiding power of portion B, which had been obtained in accordance with the invention, is superior to that of portion A.

The paper laminate test was carried out as follows:

Paper laminates incorporating the pigment were prepared using a water-soluble amino formaldehyde condensate resin binder and were exposed to Xenon radiation in a laboratory weatherometer for 24 hours. Before and after exposure the laminates were tested using a Colormaster differential colorimeter. The brightness and whiteness of each laminate on the Adams Chromatic Value System are given in the Table below. In the Adams system, "L" represents a logarithmic function of the brightness, referred to a smoked magnesium oxide surface (for which L = 100) and $b$ represents the degree of yellowness of the light reflected (the value for magnesium oxide being zero). It is desirable to have as high as 1 value as possible, and a $b$ value as near to zero as possible.

|   | Before exposure | | After exposure | | | |
|---|---|---|---|---|---|---|
|   | L | b | L | b | ΔL | Δb |
| A | 91.34 | +1.5 | 81.82 | −0.7 | −9.52 | −2.2 |
| B | 90.1 | +1.5 | 84.55 | +0.7 | −5.55 | −0.8 |

It can be seen from the above Table that the photochemical stability of portion B is superior to that of portion A.

EXAMPLE 2

800 grams of pigmentary titanium dioxide that had been obtained by the vapour phase oxidation of titanium tetrachloride were suspended in 1 litre of water in the presence of 0.25 percent by weight of tetra sodium pyrophosphate (based on the weight of $TiO_2$) as dispersing agent. The pH of the suspension was adjusted to 10.0. with caustic soda solution.

The suspension was then sand-milled for 15 minutes in a laboratory sand mill of the batch type. After sieving the milled suspension, residual sand and any titanium dioxide particles larger than 5 microns were removed by allowing them to settle out under the action of gravity for the appropriate calculated period and then decanting the remaining suspension of fine particles.

The fine titanium dioxide particles were then coated with hydrous titania and hydrous alumina by adding a quantity of titanyl aluminium sulphate solution to the suspension (the ratio by weight $TiO_2 : Al_2O_3$ in the said solution being 1.0 : 1.5) and thereafter precipitating the hydrous oxides by adding ammonium hydroxide until the pH of the suspension was 7.5. The amount of titanyl aluminium sulphate added was equivalent to 2 percent by weight of $TiO_2$ and 3 percent by weight of $Al_2O_3$, based on the titanium dioxide content of the suspension.

The resulting aqueous slurry was then divided into four equal parts. Three of these parts were subjected to the different hydrothermal pressure treatments in accordance with the invention shown in the Table below. After being treated, the pigment slurry was washed with demineralised water to remove soluble salts and filtered, and the resulting filter cake was then dried in a laboratory oven for 16 hours at 120°C.. The dried filter cakes were then crushed to a size suitable for feeding to a laboratory-scale fluid energy mill, which was operated on air. Each of the crushed pigments was then milled under the same conditions of feed rate, jet pressure and ring pressure.

In order to provide a basis for comparison, the fourth part of the aqueous slurry of the coated pigment was washed, filtered, dried and milled as described above, but without having been subjected to any hydrothermal pressure treatment.

The oil absorption value of each of the four samples of milled pigment was measured, and the pigments were then incorporated into an air-drying acrylic resin medium to the extent of 37 percent by weight in each case. The percentage gloss values of the resulting paints were measured as described in British Patent Specification No. 1,155,567, and the results obtained are shown in the following Table, which also shows the oil absorption value of the milled pigment. It is desirable to have as high a percentage gloss and as low an oil absorption as possible.

| Part No. | Hydrothermal Treatment | Oil absorption | Percentage Gloss |
|---|---|---|---|
| 1 | 4 hrs. at 100 psig and 167.5°C. | 17.5 | 75 |
| 2 | 2 hrs. at 200 psig and 197.5°C. | 16.3 | 73 |
| 3 | 30 mins. at 2,000 psig and 335°C. | 15.5 | 68 |
| 4 | None | 18.9 | 60 |

EXAMPLE 3

A quantity of rolled pigmentary $TiO_2$ that had been obtained by the sulphate process, and of which 98.5 percent was in the rutile form, was leached with demineralised water for 30 minutes at 70°C.. The leached material was then filtered and washed to reduce its water-soluble content to a low level. An aqueous slurry of the washed pigment having a concentration of 400 gm. $TiO_2$/litre was then prepared by dispersing the pigment in water at pH 10.2 in the presence of 0.25 percent by weight of sodium tetrapyrophosphate as dispersing agent. A coating comprising hydrous alumina and hydrous titania was then applied to the pigmentary particles in the following manner at room temperature.

3 percent by weight of aluminium sulphate (calculated as $Al_2O_3$ and based on the weight of $TiO_2$) was added to the pigment slurry in the form of an aqueous solution containing the equivalent to 100 gms. $Al_2O_3$/l. This addition reduced the pH of the slurry to 3.2. Hydrous alumina incorporating some basic aluminium sulphate was then precipitated onto the titanium dioxide particles by adding sodium hydroxide solution to the slurry with stirring until the pH was 7.0. Two percent by weight of titanium tetrachloride (calculated as $TiO_2$ and based on the weight of $TiO_2$ initially present in the slurry) was added to the slurry of the alumina-coated pigment over a period of 15 minutes, and the slurry was then stirred for a further 15 minutes, after which time its pH was 3.8 and 42 percent of the hydrous alumina had been dissolved. The titanium tetrachloride was added to the slurry in the form of a solution containing the equivalent of 160 gms. $TiO_2$ per litre, and substantially the whole of the titanium tetrachloride was precipitated as hydrous titania.

The dissolved alumina was then re-precipitated onto the pigmentary particles by the addition of sodium hydroxide solution over a period of 30 minutes to give a final pH of 7.2. The resulting slurry was filtered and the filter cake so obtained was divided into 13 equal parts. Twelve of these parts were subjected to the different hydrothermal pressure treatment in accordance with the invention and shown in the Table below. After being treated, the pigment was washed with demineralised water to remove soluble salts and filtered, and the resulting filter cake was then dried in a laboratory oven for 16 hours at 120°C. The dried filter cakes were then crushed to a size suitable for feeding to a laboratory scale fluid energy mill, which was operated on air. Each of the crushed pigments was then milled under the same conditions of feed rate, jet pressure and ring pressure.

In order to provide a basis for comparison, the thirteenth part of the initial filter cake was washed, filtered, dried and milled as described above, but without having been subjected to any hydrothermal pressure treatment.

As described in Example 2, the oil absorption value of each of the thirteen samples of milled pigment, and the percentage gloss of paints incorporating the pigments, were measured. The results are included in the following Table.

| Part No. | Hydrothermal Treatment | Oil absorption | Gloss |
|---|---|---|---|
| 1 | 15 mins. at 150°C. (corresponding to 55 psig) | 18.7 | 67 |
| 2 | 30 mins. at 150°C. (corresponding to 55 psig) | 18.7 | 70 |
| 3 | 60 mins at 150°C. (corresponding to 55 psig) | 18.7 | 72 |
| 4 | 120 mins. at 150°C. (corresponding to 55 psig) | 18.7 | 70 |
| 5 | 15 mins. at 200°C. (corresponding to 210 psig) | 17.5 | 71 |
| 6 | 30 mins. at 200°C. (corresponding to 210 psig) | 18.4 | 75 |
| 7 | 60 mins. at 200°C (corresponding to 210 psig) | 17.5 | 73 |
| 8 | 120 mins. at 200°C. (corresponding to 210 psig) | 17.8 | 76 |
| 9 | 15 mins. at 250°C. (corresponding to 580 psig) | 16.6 | 75 |
| 10 | 30 mins. at 250°C. (corresponding to 580 psig) | 17.5 | 77 |
| 11 | 60 mins. at 250°C. (corresponding to 580 psig) | 17.2 | 75 |
| 12 | 120 mins. at 250°C. (corresponding to 580 psig) | 16.0 | 76 |
| 13 | None | 20.3 | 65 |

EXAMPLE 4

An aqueous dispersion of pigmentary titanium dioxide was prepared as described in Example 3. The pigmentary particles were then coated with hydrous alumina and hydrous titania as described below.

Aluminium sulphate solution equivalent to 5 percent by weight of $Al_2O_3$ (based on the weight of $TiO_2$) was added to the dispersion thereby reducing its pH to 3.4. Hydrous alumina incorporating some basic aluminium sulphate was then precipitated onto the pigment by adding sodium hydroxide solution to the slurry over a period of 15 minutes until a pH of 8.0 was attained. After precipitation, a quantity of titanium tetrachloride (165 mg. $TiO_2/l$) equivalent to 2% by weight to $TiO_2$ was added to the slurry over a period of 10 minutes. The pH of the resulting slurry was 3.6 and 76 percent of the hydrous alumina had been dissolved. At the same time substantially the whole of the added titanium tetrachloride had been precipitated as hydrous titania. The pH of the acidic slurry was then raised to 8.0 by the addition of sodium hydroxide solution, causing reprecipitation of the hydrous alumina that had been dissolved in the previous step. The resulting coated particles were then isolated by filtration and the filter cake so obtained was divided into four parts. Three of the parts were hydrothermally treated for 30 minutes at 150°, 200° and 250°C. respectively, and the treated pigments were washed, filtered, dried and milled, as described in Example 3.

In order to provide a basis for comparison, the fourth part of the initial filter cake was washed, filtered, dried and milled under the same conditions as the other three parts, but without having been subjected to any hydrothermal pressure treatment.

As described in Example 3, oil absorption and gloss values were measured, and the results are set out in the following Table:

| Part No. | Hydrothermal Treatment | Oil absorption | Gloss |
|---|---|---|---|
| 1 | 30 mins. at 150°C. (corresponding to 55 psig) | 22.4 | 62 |
| 2 | 30 mins. at 200°C. (corresponding to 210 psig) | 19.7 | 70 |
| 3 | 30 mins. at 250°C. (corresponding to 580 psig) | 16.9 | 76 |
| 4 | None | 23.1 | 53 |

EXAMPLE 5

A disperse aqueous slurry of titanium dioxide pigment was prepared as described in Example 3, and the pigmentary particles were then coated with hydrous alumina and hydrous zirconia as described below.

Aluminium sulphate solution equivalent to 3 percent by weight of $Al_2O_3$ (based on $TiO_2$) was added to the disperse slurry, thereby reducing its pH to 3.3. Hydrous alumina incorporating some basic aluminium sulphate was then precipitated onto the pigmentary particles by adding ammonium hydroxide solution to the slurry over a period of 15 minutes until a pH of 6.0 was attained. After precipitation, a quantity of zirconium oxychloride solution (80 gm. $ZrO_2/l$) equivalent to 2 percent by weight of $ZrO_2$ (based on the weight of $TiO_2$) was added to the slurry over a period of 10 minutes. The pH of the resulting slurry was 3.7 and 67 percent of the hydrous alumina had been dissolved. At the same time substantially the whole of the added zirconium oxychloride had been precipitated as hydrous zirconia. The pH of the acidic slurry was then raised to 8.0 by the addition of ammonium hydroxide solution, causing reprecipitation of the hydrous alumina that had been dissolved in the previous step. The resulting slurry was then filtered and the filter cake obtained was divided into ten parts, nine of which were subjected to the different hydrothermal pressure treatments shown in the Table below. As described in Example 3, the treated pigments were washed, filtered, dried and milled.

In order to provide a basis for comparison, the tenth part of the initial filter cake was washed, filtered, dried and milled under the same conditions as the other nine parts, but without having been subjected to any hydrothermal pressure treatment.

As described in Example 3, oil absorption and gloss values were measured, and the results are set out in the following Table:

| Part No. | Hydrothermal Treatment | Oil absorption | Gloss |
|---|---|---|---|
| 1 | 15 mins. at 150°C. (corresponding to 55 psig) | 20.0 | 62 |
| 2 | 30 mins. at 150°C. (corresponding to 55 psig) | 20.3 | 66 |
| 3 | 60 mins. at 150°C. (corresponding to 55 psig) | 19.7 | 68 |
| 4 | 15 mins. at 200°C. (corresponding to 210 psig) | 19.4 | 68 |
| 5 | 30 mins. at 200°C. (corresponding to 210 psig) | 19.1 | 70 |
| 6 | 60 mins. at 200°C. (corresponding to 210 psig) | 18.4 | 71 |
| 7 | 15 mins. at 250°C. (corresponding to 580 psig) | 18.4 | 75 |
| 8 | 30 mins. at 250°C. | 18.7 | 76 |

| | | | |
|---|---|---|---|
| 9 | (corresponding to 580 psig) 60 mins. at 250°C. | 18.7 | 73 |
| 10 | (corresponding to 580 psig) None | 19.1 | 68 |

After the hydrothermal pressure treatment processes, the pigment coatings were examined under the electron microscope at a magnification of 150,000. It was found that the coatings of parts 1 to 5 were generally amorphous, and appeared very similar to the coating of part 10, which had not been hydrothermally treated.

The coating of part 6 showed the presence of some microcrystals in the form of spikes, and part 7 was very similar. In the coatings of parts 8 and 9, the crystals were somewhat larger, and some bare patches were observed, indicating that the coating had shrunk away from certain sites.

EXAMPLE 6

An aqueous slurry of rolled and leached titanium dioxide pigment, that had been prepared by the sulphate process, was prepared by dispersing the pigment in water in the presence of 0.25 percent by weight of tetron as dispersing agent. The pigment concentration in the slurry was 240 grams/litre. 6 percent by weight of magnesium sulphate (calculated as MgO and based on the weight of $TiO_2$) was slowly added to the pigment slurry in the form of an aqueous solution containing the equivalent of 80 gm MgO/1. The slurry was then heated to 80°C. and maintained at this temperature for 30 minutes, after which time the pH was adjusted to 10 by the addition of 10N sodium hydroxide, so precipitating magnesium hydroxide onto the pigmentary particles. The resulting slurry was filtered while still hot.

One third of the filter cake so obtained was then subjected to hydrothermal pressure treatment in an autoclave for 2 hours at 185°C. The treated pigment was allowed to cool slowly and was then washed, filtered, dried, and milled, as described in Example 3, to yield a finished pigment I.

The remaining two-thirds of the filter cake was washed and was then slurried in one litre of water and filtered. The slurry so obtained was filtered, and the filter cake was then slurried and filtered twice: the filter cake finally obtained was divided into two portions. One portion was subjected to hydrothermal pressure treatment in an autoclave for 2 hours at 185°C. The treated pigment was allowed to cool slowly and was then dried and milled to yield a finished pigment II.

In order to provide a basis for comparison, the second portion of the washed filter cake was dried and milled under the same conditions as were employed for pigments I and II, but without having been subjected to any hydrothermal pressure treatment.

As described in Example 2, the oil absorption value of each of pigments I to III, and the percentage gloss of paints incorporating the pigments, were measured. The results were as follows:

| Sample | Gloss | Oil Absorption |
|---|---|---|
| 1 | 39 | 20.6 |
| 2 | 38 | 20.9 |
| 3 | 24 | 24.4 |

It can be seen from these results that an improvement in the gloss and oil absorption values of the pigment was obtained both when the coated pigment was washed prior to being subjected to hydrothermal pressure treatment (pigment II), and when the washing was not carried out until after the treatment process.

EXAMPLE 7

Four samples of finished titanium dioxide pigment were prepared as described below.

Titanium dioxide pigment was coated with 3 percent by weight of hydrous alumina (calculated as $Al_2O_3$) and 2 percent by weight of hydrous titania (calculated as $TiO_2$) as described in Example 3. One portion of the coated pigment was subjected to hydrothermal pressure treatment for 30 minutes at 195°C. (corresponding to 200 p.s.i.g.), and was then washed, dried, and milled in a fluid-energy mill to yield a finished pigment I. In order to provide a basis for comparison, a further portion of the coated pigment was washed, dried and milled under the same conditions to yield a finished pigment II, but without being subjected to hydrothermal pressure treatment.

Titanium dioxide pigment was coated with hydrous alumina and hydrous titania as described in Example 4, except that the proportion of hydrous titania was 1 percent by weight, instead of 2 percent by weight as described in that Example. One portion of the coated pigment was subjected to hydrothermal pressure treatment for 30 minutes at 195°C. (corresponding to 200 p.s.i.g.), and the treated pigment was then washed, dried and milled under the same conditions as samples I and II, to yield a finished pigment III. In order to provide a basis for comparison, a further portion of the coated pigment was washed, dried and milled under the same conditions, but without having been subjected to any hydrothermal pressure treatment. The resulting finished pigment was designated IV.

The brightness and whiteness of each of pigments I to IV, and of air-drying alkyd paint media incorporating the pigments, were then measured on the Adams Chromatic Value System (see Example 1). The L and b values so obtained are set out in the following table.

| Pigment | Pigment alone | | Air-drying alkyd medium | | Δb |
|---|---|---|---|---|---|
| | L | b | L | b | |
| I | 97.3 | +2.0 | 94.2 | +3.6 | +1.6 |
| II | 97.4 | +2.0 | 94.2 | +4.5 | +2.5 |
| III | 97.2 | +2.2 | 94.2 | +3.6 | +1.6 |
| IV | 97.5 | +2.0 | 94.1 | +4.2 | +2.2 |

It can be seen from the above table that the increase in yellowing resulting from incorporating the pigment into an alkyd medium was relatively less for those pigments that had been subjected to hydrothermal pressure treatment.

EXAMPLE 8

A quantity of titanium dioxide pigment that had been prepared by the vapour-phase oxidation of titanium tetrachloride was dispersed in water and the resulting dispersion was heated to 60°C. Sodium phosphate solution (containing the equivalent of 25.0g phosphorus pentoxide per litre) and aluminium sulphate solution (containing the equivalent of 100g aluminium oxide per litre) was added simultaneously to the dispersion over a period of 45 minutes until 2 percent by weight $P_2O_5$ (based on $TiO_2$) and 1.5 percent by weight $Al_2O_3$ (based on $TiO_2$) were present. The pH of the dispersion was adjusted to 6 by the addition of sodium hydroxide solution over a period of 30 minutes and the resulting slurry was then stirred for a further 30 minutes. The phosphate-coated pigment was then recovered by filtration and the filter cake was washed and divided into two portions.

One portion of the filter cake was subjected to hydrothermal pressure treatment for one hour in an autoclave at 185°C. (150 p.s.i.g.). After being allowed to cool, the treated pigment was dried in a laboratory oven for 16 hours at 110°C. to yield pigment A.

The other portion of the filter cake was dried in the same manner as described for portion A, to yield pigment B.

Each of the two dried portions A and B was tested in a paper laminate formulation as described in Example 1, and the following results were obtained.

|   | Before Exposure | | After Exposure | | | |
|---|---|---|---|---|---|---|
|   | L | b | L | b | $\Delta L$ | $\Delta b$ |
| A | 90.1 | +1.3 | 86.2 | +0.9 | −3.9 | −0.4 |
| B | 90.6 | +1.3 | 82.7 | −0.3 | −7.9 | −1.6 |

It can be seen from the above table that the photochemical stability of portion A was superior to that of portion B.

We claim:

1. A process for the treatment of an oxide pigment, which comprises coating the pigment with at least one substance selected from the group consisting of hydroxides, hydrous oxides, phosphates, and basic sulphates, and thereafter subjecting the coated pigment to hydrothermal pressure treatment by maintaining it at a temperature of at least 50°C. in contact with liquid water, the total ambient pressure during said hydrothermal pressure treatment being greater than one atmosphere.

2. A process according to claim 1, wherein an aqueous mixture including the coated pigment is sealed in a closed vessel and thereafter heated to the treatment temperature to produce a superatmospheric pressure.

3. A process according to claim 1, wherein the coated pigment is maintained at a temperature of at least 150°C. in said hydrothermal pressure treatment.

4. A process according to claim 1, wherein the duration of the said hydrothermal pressure treatment is at least 15 minutes.

5. A process according to claim 1, wherein the duration of the said hydrothermal pressure treatment does not exceed 2 hours.

6. A process according to claim 1, which includes the step of conveying the hydrothermally-treated pigment to apparatus for carrying out a further process step, the superatmospheric pressure in the treatment vessel being utilized in effecting said conveyance.

7. A process as claimed in claim 1 which comprises the step of milling said pigment after said hydrothermal pressure treatment.

8. A process according to claim 2, wherein a quantity of gas is introduced into the treatment vessel to augment the ambient pressure.

9. A process according to claim 4, wherein the said duration is at least 30 minutes.

10. A process according to claim 6, which includes the step of washing the coated pigment prior to the hydrothermal pressure treatment, and wherein the said further process step comprises spray drying the pigment.

11. An oxide pigment bearing a hydrothermally pressure treated coating comprising at least one substance selected from the group consisting of hydroxides, hydrous oxides, phosphates, and basic sulphates prepared by the process of claim 1.

* * * * *